United States Patent
Biskeborn

(10) Patent No.: US 7,382,581 B2
(45) Date of Patent: Jun. 3, 2008

(54) TAPE HEAD HAVING A SUPPORT PLATE WITH CONTOURED SURFACE

(75) Inventor: Robert Glenn Biskeborn, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 32 days.

(21) Appl. No.: 11/426,558

(22) Filed: Jun. 26, 2006

(65) Prior Publication Data

US 2006/0232884 A1 Oct. 19, 2006

Related U.S. Application Data

(63) Continuation of application No. 10/738,585, filed on Dec. 17, 2003, now Pat. No. 7,133,261.

(51) Int. Cl.
G11B 5/29 (2006.01)
G11B 5/584 (2006.01)

(52) U.S. Cl. .................. 360/129; 360/121; 360/291

(58) Field of Classification Search ............... 360/121, 360/128, 129, 291, 130.21
See application file for complete search history.

(56) References Cited

U.S. PATENT DOCUMENTS

| 4,860,132 | A | * | 8/1989 | Lorteije ..................... 360/84 |
| 5,003,423 | A | * | 3/1991 | Imamura et al. ............ 360/125 |
| 5,357,390 | A | * | 10/1994 | Vollmann .............. 360/130.21 |
| 5,710,683 | A | * | 1/1998 | Sundaram ................... 360/126 |
| 5,737,158 | A | * | 4/1998 | Tanaka et al. .......... 360/130.21 |
| 5,883,770 | A | * | 3/1999 | Biskeborn et al. ...... 360/130.21 |
| 5,905,613 | A | * | 5/1999 | Biskeborn et al. ...... 360/130.21 |
| 5,978,188 | A | * | 11/1999 | Kaaden et al. .......... 360/130.32 |
| 6,108,165 | A | * | 8/2000 | Maruyama et al. ....... 360/271.5 |
| 6,122,147 | A | * | 9/2000 | Fahimi et al. ............... 360/221 |
| 6,356,416 | B1 | * | 3/2002 | Abertini ................... 360/271.5 |
| 6,369,982 | B2 | * | 4/2002 | Saliba ......................... 360/122 |
| 6,469,867 | B2 | * | 10/2002 | Saliba ......................... 360/122 |
| 6,587,305 | B2 | * | 7/2003 | Saliba ......................... 360/129 |
| 6,639,753 | B1 | * | 10/2003 | Henze et al. ................ 360/121 |
| 6,721,126 | B1 | * | 4/2004 | Bui et al. ................. 360/78.12 |
| 6,760,177 | B2 | * | 7/2004 | Biskeborn ..................... 360/71 |
| 6,771,456 | B2 | * | 8/2004 | Winarski et al. .......... 360/78.02 |
| 6,914,754 | B2 | * | 7/2005 | Tamura .................... 360/261.3 |
| 6,937,435 | B2 | * | 8/2005 | Saliba ......................... 360/122 |
| 6,940,682 | B2 | * | 9/2005 | Bui et al. ................. 360/77.12 |
| 7,248,438 | B2 | * | 7/2007 | Biskeborn et al. ........... 360/129 |
| 2003/0223151 | A1 | * | 12/2003 | Wakita et al. .............. 360/129 |
| 2005/0201017 | A1 | * | 9/2005 | Koga et al. ................. 360/291 |

* cited by examiner

*Primary Examiner*—Jefferson Evans
(74) *Attorney, Agent, or Firm*—Zilka-Kotab, PC

(57) ABSTRACT

A tape recording head is provided comprising a support plate having a contoured surface with an opening in the contoured surface which allows head chips to protrude far enough to allow proper head tape contact for recording. The support plate is fixed on a coarse actuator so that the support plate and coarse actuator move together perpendicular to the motion of the recording tape. The head chips comprising rowbar substrates containing a multiplicity of recording elements are supported on a carrier mounted on a fine actuator and are not fixed to the support plate to allow low mass fine actuation.

5 Claims, 5 Drawing Sheets

TAPE HEAD HAVING A SUPPORT PLATE WITH CONTOURED SURFACE

RELATED APPLICATIONS

This application is a continuation of U.S. patent application Ser. No. 10/738,585, filed Dec. 17, 2003 now U.S. Pat. No. 7,133,261.

BACKGROUND OF THE INVENTION

1. Field of the Invention

This invention relates to magnetic tape recording heads, and more particularly to a tape recording head with a support plate having a contoured surface to support the recording tape passing over the recording head.

2. Description of the Related Art

In magnetic storage systems, data is read from and written onto magnetic recording media utilizing magnetic transducers commonly referred to as magnetic heads. Data is written on the magnetic recording media by moving a magnetic recording head to a position over the media where the data is to be stored. The magnetic recording head then generates a magnetic field, which encodes the data into the magnetic media. Data is read from the media by similarly positioning the magnetic read head and then sensing the magnetic field of the magnetic media. Read and write operation are independently synchronized with the movement of the media to ensure that the date can be read from and written to the desired location on the media.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. This movement generally entrains a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are in intimate or near contact with the tape to effect efficient signal transfer, and so that the read element is in intimate or near contact with the tape to provide effective coupling of the magnetic field from the tape to the read element. The conventional head contour comprises a cylindrical or complex shape which is critical in maintaining the moving tape at the desired spacing from the head. The contact, or near contact, spacing is maintained by controlling the contour shape to "bleed", or scrape the boundary layer of air carried by the tape away and into bleed slots before encountering the transducer to prevent the tape from "flying", or losing contact with the transducer.

Alternatively, the contour is designed with a small radius and a high wrap angle so that high pressure is exerted on the head while the tension is low. However, the contour of the head must be such that the pressure exerted by the tape on the transducer is not so high that the surface of the transducer wears excessively. Heads are often provided with outriggers on both sides of the head which help support the tape and reduce head wear, but, more importantly, control the wrap angle of the tape with respect to the head. Any change in radius will change the pressure of the tape pate on the head at the same tape tension.

A flat contour thin film tape recording head for a bi-directional tape drive has been described in U.S. Pat. No. 5,905,613. The flat contour head comprises a flat transducing surface on a substrate having a row of thin film transducers formed on a surface on one side of the substrate which forms a gap. The substrate with the row of transducers is called a "rowbar substrate". The transducers are protected by a closure of the same or similar ceramic as the substrate. For a read-while-write bi-directional head which requires that the read transducer follows behind the write transducer, two rowbar substrates with closures are mounted in a carrier facing one another. The recording tape overwraps the corners of both substrates with an angle sufficient to scrape the air from the surface of the tape and not so large as to allow air to reenter between the tape and the transducing surface after the tape passes the corner. By scraping the air from the surface of the moving tape, a vacuum forms between the tape and the flat transducing surface holding the tape in contact with the transducing surface. At the corners of the substrates, bending of the recording tape due to the overwrap results in separation of the tape from the transducing surface for a distance that depends on the wrap angle, the tape thickness and the tape tension. The transducers must be spaced from the corners of the substrate at a sufficient distance to allow the vacuum between the tape and the transducing surface to overcome the separation.

There is an ongoing need for reduced separation of the transducers and the recording media and of improved control and reliability of this separation in order to support constantly increasing date density and speed requirements of data storage systems. The present invention provides an improved recording head to address this need.

SUMMARY OF THE INVENTION

In accordance with the principles of the present invention, there is disclosed a tape recording head comprising a support plate having a contoured surface with an opening in the contoured surface which allows head chips to protrude far enough to allow proper head tape contact for recording. An embodiment of the tape recording head comprising a support plate having a cylindrical surface with a rectangular opening in the cylindrical surface is described. The support plate is fixed on a coarse actuator so that the support plate and actuator move together in a direction perpendicular to the direction of tape motion over the head to position magnetic transducers on the head chips on data tracks recorded at positions across the tape width. The head chips comprising rowbar substrates containing a plurality of magnetic transducers are supported on a carrier mounted on a fine actuator. The head chips are not fixed to the support plate to allow low-mass, high bandwidth fine actuation capability of the magnetic transducers on the recorded data tracks. The tape flies over the support plate with a spacing of approximately 1-5 microns depending on the tape, tape speed and skirt radius. The support plate is made of ceramic material, such as Al—Ti—C, or a hardened metallic alloy to provide sufficient wear resistance at the edges of the tape and near the support plate opening where contact with the tape may occur.

In one embodiment, a magnetic recording head is provided, including a support plate having a contoured surface with an opening in the contoured surface. Additionally, at least one head chip comprising a substrate containing a plurality of magnetic recording elements is included, the head chip positioned to protrude through the opening in the contoured surface of the support plate for read/write access to a magnetic recording tape, wherein the at least one head chip includes two transducing surfaces separated in a direction parallel to a direction of tape travel over the at least one head chip by a gap and held in fixed relation to one another.

The above as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

Figure 1:
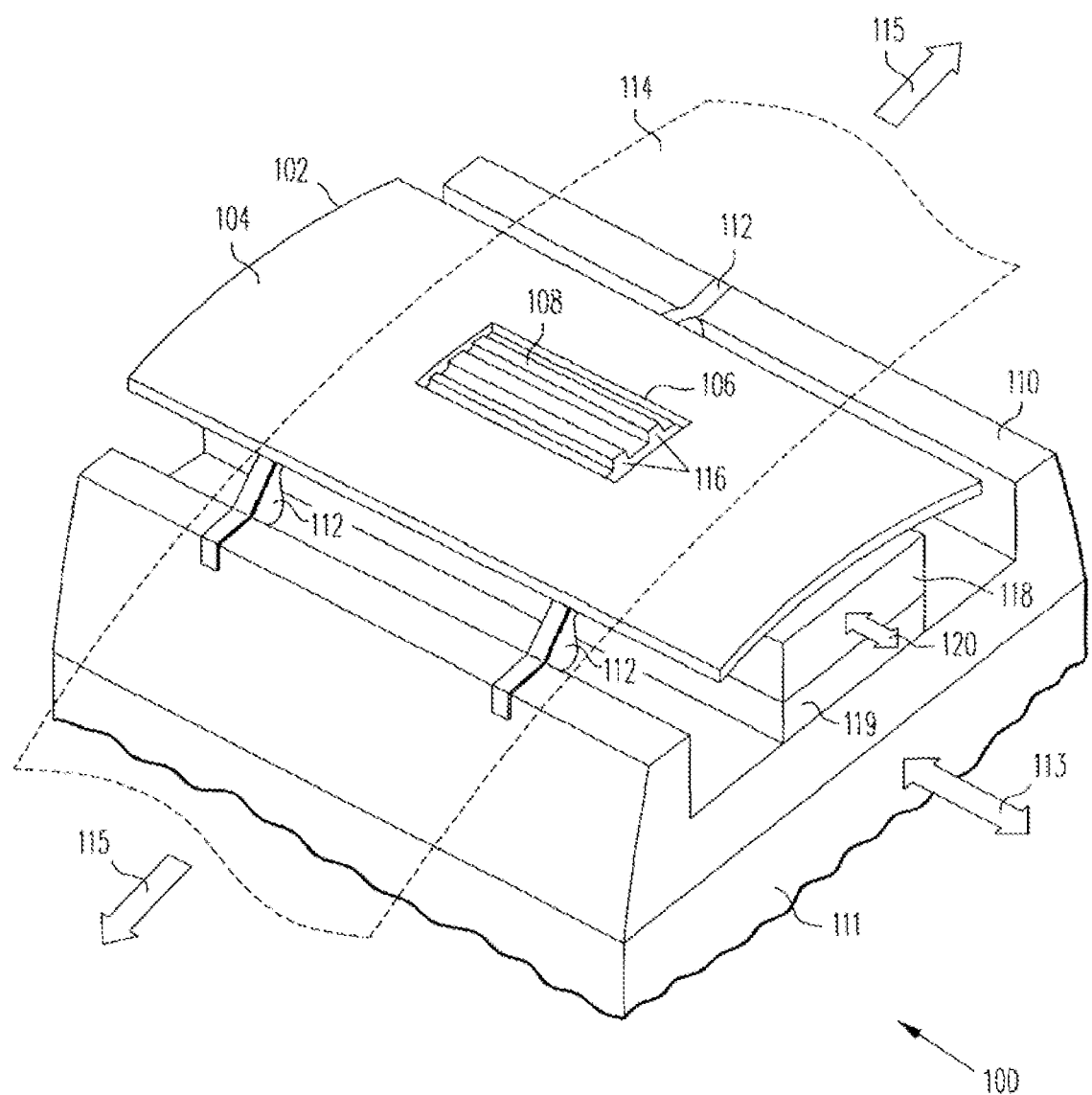
FIG. 1 is a perspective illustration, not to scale, of a first embodiment of a tape recording head of the present invention.
Figure 2:
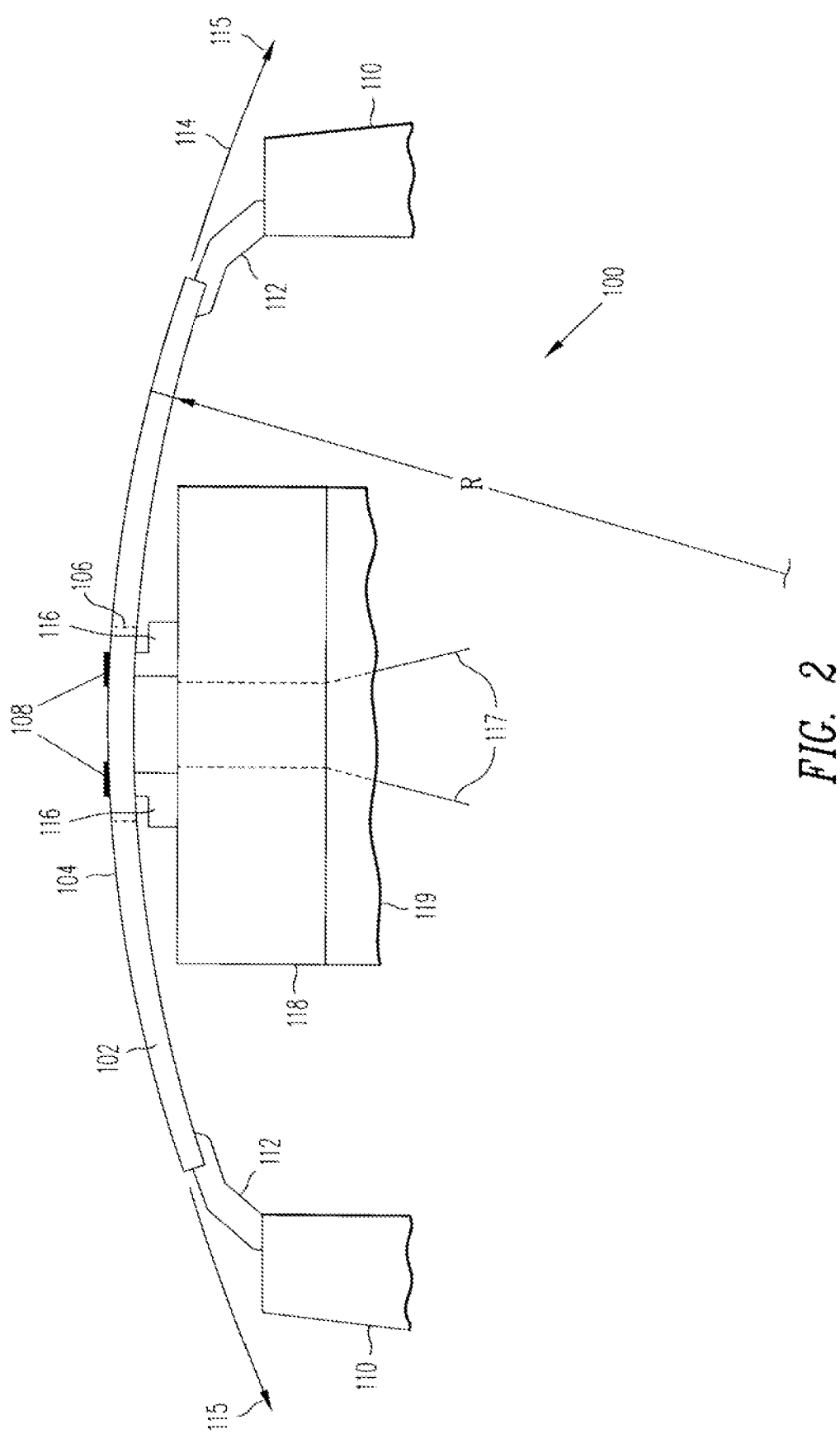
FIG. 2 is an end view illustration, not to scale, of the embodiment of the tape recording head shown in FIG. 1.

FIG. 1 is a perspective view, not to scale, of a first embodiment of the tape recording head 100 of the present invention. FIG. 2 shows and end view, not to scale, of the tape recording head 100. Referring to FIGS. 1 and 2, the tape recording head 100 comprises a support plate 102 having a cylindrical contoured surface 104 with a rectangular opening 106 which allows head chips 108 to protrude far enough to allow proper head tape contact for recording. The cylindrical contoured surface 104 has a substantially rectangular shape. The support plate 102 is fixed by supports 112 on a base carrier 110 that is rigidly mounted on a coarse actuator 111 so that the support plate 102 and coarse actuator move together in a direction perpendicular to the direction of the linear motion 115 of recording tape 114 (shown in phantom) over recording head 100. The head chips 108 comprising rowbar substrates 116 containing a multiplicity of recording transducers are supported on a carrier 118 mounted on a fine actuator 119 and are not fixed to the support plate 102 to allow low-mass, high bandwidth fine actuation relative to the recording tape 114 as indicated by the arrow 120. Electrical connection cables 117 connect the transducers on the head chips 108 to the read/write channel of the associated tape drive.

Figure 3:
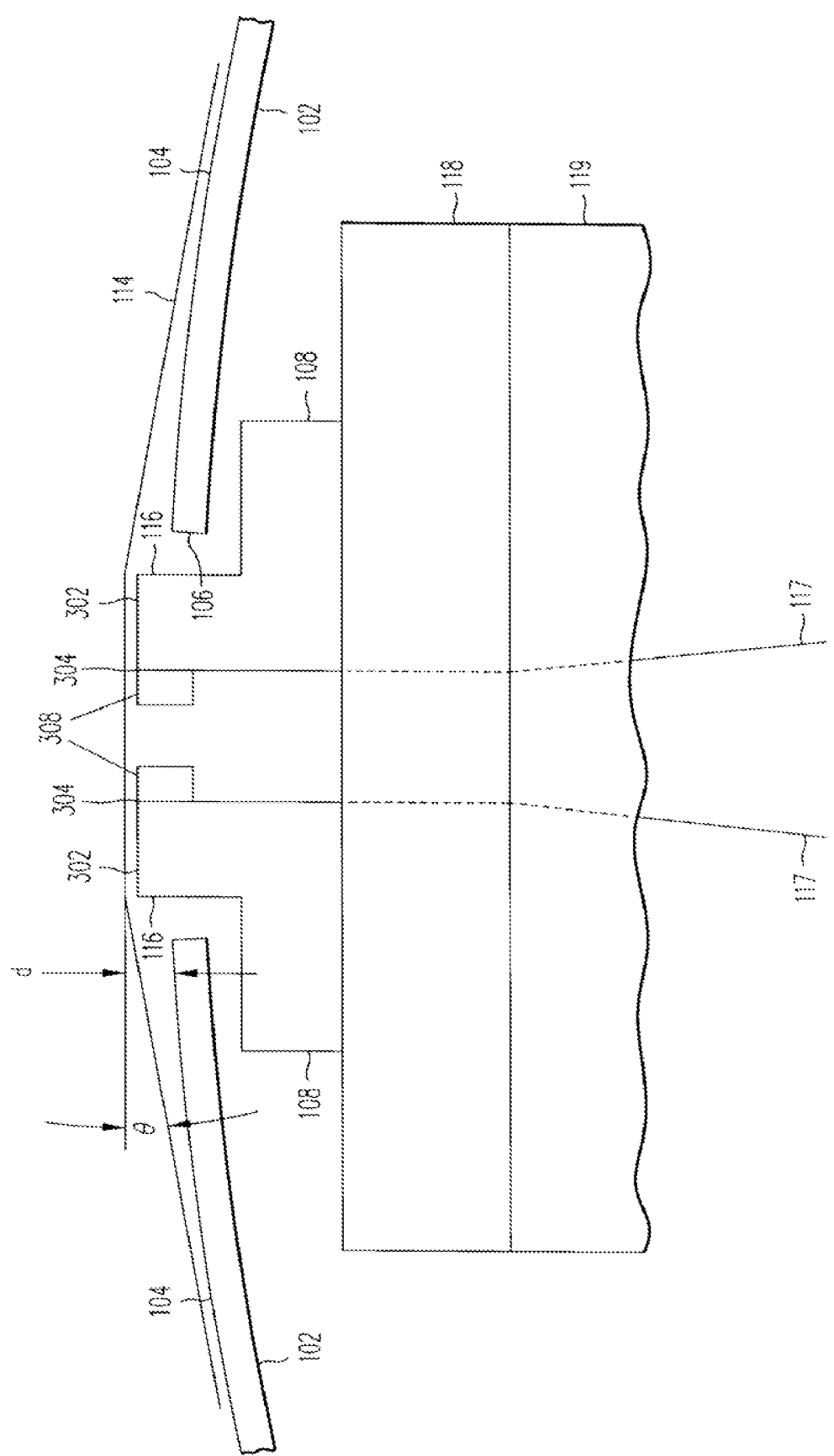
FIG. 3 is an end view section, not to scale, of the head chips and carrier portion of a first embodiment of the tape recording head shown in FIGS. 1 and 2.

FIG. 3 shows an end view section, not to scale, of the head chips 108 and carrier 118 portion of the tape recording head 100 of FIGS. 1 and 2. The head chip 108 is a bi-directional read-while-write head similar to tape recording heads described in U.S. Pat. No. 5,905,613 which discloses a flat contour linear tape recording head and U.S. Pat. No. 5,883,770 which discloses a partial width linear tape redcording head. The head chip 108 comprises rowbar substrates 116 of a wear resistant material, such as the substrate ceramic typically used in magnetic disk drive heads, fixed on a carrier 118 mounted on a fine actuator means 119. The ceramic rowbar substrates 116 are provided with transducing surfaces 302 and a row of transducers on the surfaces of gaps 304. Electrical connection cables 117 connect the transducers to the read/write channel of the associated tape drive. The rows of transducers are protected by closure 308 made of the same or similar ceramic as the rowbar substrates 116. The transducing surfaces 302 of the rowbar substrates 116 are designed to protrude a distance d above the cylindrical surface 104 of the support plate 102 when assembled in the tape recording head 100 of FIGS. 1 and 2 to allow proper contact with the recording tape 114. The protrusion distance d of the transducing surfaces 302 is typically in the range of 5-25 microns. The protrusion distance d determines the wrap angle h of the tape 114 at the edge of the transducing surface 302. Because of the protrusion of the transducing surfaces above the cylindrical surface of the support plate, the tape usually does not contact the edge of the rectangular opening 106 of the support plate.

The support plate 102 is fabricated to have a cylindrical surface 104 having a polished surface finish. If desired, the polished surface may include microgrooves or other surface texture for controlling sticking in humid environments when the tape is at rest. During operation, the recording tape 114 normally flies over the cylindrical surface 104 with a separation or fly height in the range of approximately 1-5 microns depending on the tape, tape velocity and radius. A radius R of 33 mm for cylindrical surface 104 was used to give the desired performance for a minimum fly height flat head. However, a radius R in the range of 10-100 mm may be used for various recording head designs and applications. The rectangular opening 106 is formed by molding or, alternatively, by a suitable matching process to have dimensions slightly greater than the head chip 108 dimensions to allow for fine actuation movement of the a head without interference from the support plate 102. The dimension of the support plate in the direction perpendicular to the direction of tape motion is preferably chosen to support the tape over the full range of actuation of the tape recording head. The thickness of the support plate is chosen to be sufficient to provide the desired strength and rigidity. Typically, the support plate 102 is aligned to the head chips 108 after the head and actuator are assembled. The support plate position is controlled to typically +/−2 microns relative to the head chips for proper operation. The support plate is formed of a hard ceramic, such as Al—Ti—C, or of a hardened metallic alloy. Alternatively, the support plate may be formed of a metal, ceramic or plastic material coated with a hard wear layer such as, for example, Si—N to provide wear resistance at possible areas of contact with the tape at the tape edges and near the opening 106 in the support plate. The support plate is preferably static dissipative, or conductive and grounded or held at an appropriate bias potential to avoid electrostatic charge buildup.

One embodiment of the magnetic recording head 100 of the present invention comprises a support plate 102 having a cylindrical contoured surface 104 with a substantially rectangular opening 106 in the surface to allow head chips 108 to protrude. Alternatively, support plates having other contoured surfaces may be used. For example, the cylindrical contoured surface 104 having a constant radius of curvature R in the direction of linear motion 115 of the tape as shown in FIG. 2 may be modified to have a smoothly varying radius of curvature in going from the left side to the midpoint and from the midpoint to the right side of the support plate shown in FIG. 2. A large radius of curvature at the left edge of the support plate changing to a smaller radius of curvature at the midpoint of the support plate and changing back to a large radius of curvature at the right edge of the support plate would be one of many possibilities that may be advantageous. Slight contouring of the support plate in the direction perpendicular to the direction of linear motion 115 of the tape relative to the magnetic recording head can also be used and may be advantageous in improving stability of the tape relative to the recording head. Similarly, alternative shapes of the opening 106 may be used to better match the shape of the particular head chips being used. For example, a circular or substantially circular opening may be appropriate for a circular button-shaped head chip design. In the first embodiment, the opening 106 is approximately centered in the contoured surface 104 of the support plate 102. Alternatively, the opening may be offset from the center of the support plate. The contoured surface of the support plate may have shapes other than the substantially rectangular shape of the embodiment illustrated in FIG. 1. The contoured surface may, for example, have a square shape or may be circular or oval in shape in other embodiments.

The embodiment illustrated in FIGS. 1-3 has transducing surfaces 302 that are flat and lie in a common plane. Alternatively, the transducing surfaces 302 of the two row-bar substrates 116 may be contoured or may be tilted at a small angle with respect to one another.

Coarse and fine actuation for positioning the magnetic tape recording head perpendicular to the direction of tape motion over the head may be implemented by a number of actuator means known to the art including among others electric motor driven lag screws, electromagnetic induction drives (voice coil drives) and piezoelectric devices. Electric motor driven lag screw devices and voice coil drives are most suitable for use in coarse actuator devices moving relatively large masses over relatively long distances. Micro electromagnetic induction drives and piezoelectric devices are suitable for fine actuator devices moving small masses over small distances with high bandwidth performance.

Figure 5:
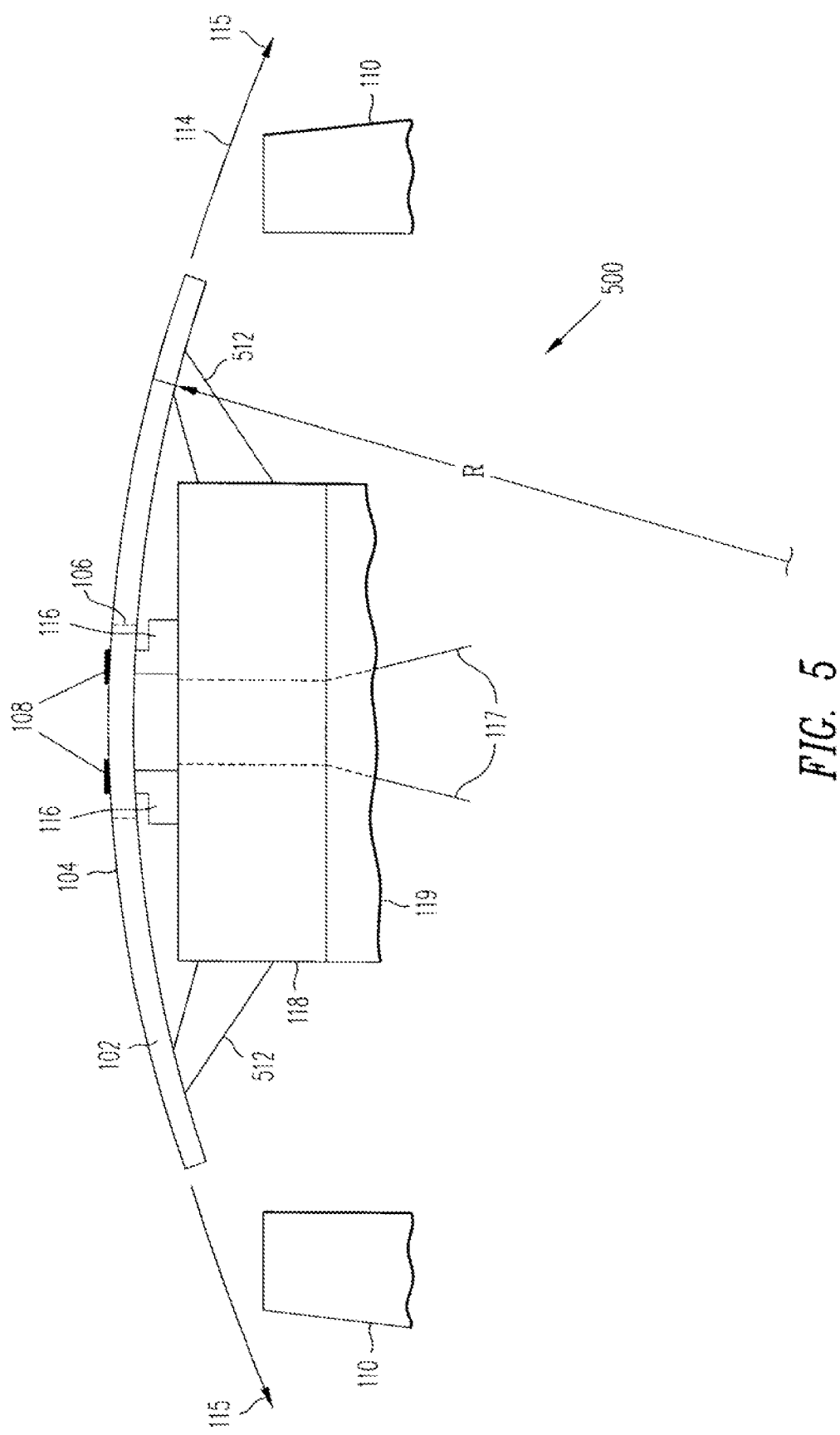
FIG. 5 is an end view section, not to scale, of the head chips and carrier portion of a second embodiment of the tape recording head.

FIG. 5 shows a second embodiment of a tape recording head 500 according to the present invention. Tape recording head 500 differs from the tape recording head 100 shown in FIGS. 1-3 in having the support plate 102 fixed by supports 512 on the carrier 118 instead of being fixed by support 112 on the base carrier 110. Fixing the support plate 102 on the carrier 118 results in having the support plate 102 and the head chips 108 moving together with movement of the fine actuator 119. In all other respects, the tape recording head 500 of the second embodiment is the same as the tape recording head 100 of the first embodiment. In this embodiment the mass of the support plate 102 adds to the total mass that has to be moved by the fine actuator which to a degree degrades the high frequency performance of the fine actuation means. However, fixing the support plate to the carrier simplifies alignment of the support plate to the head chips.

Figure 4:
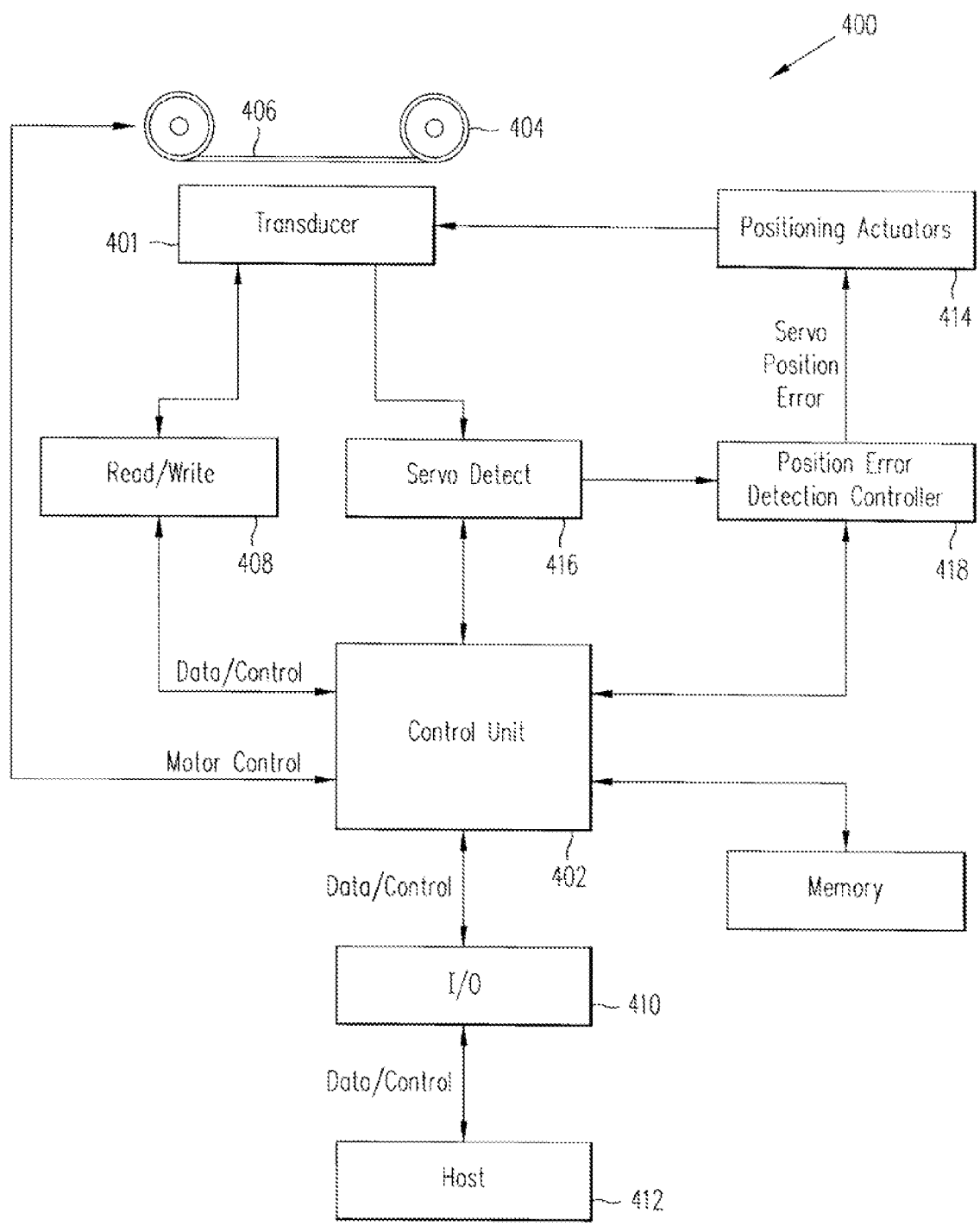
FIG. 4 is a simplified diagram of a magnetic tape recorder system using the magnetic recording head of the present invention.

FIG. 4 illustrates an embodiment of magnetic tape recorder or tape drive system 400 incorporating the tape recording head of the present invention. A tape drive control unit 402 provides a motor control signal to rotate tape reels 404 and move magnetic tape 406 across the read/write transducer head 401. Read/write channel 408 transmits read/write signals between the read/write transducer 401 and the control unit 402. The data is communicated through I/O channel 410 with host 412. Lateral positioning of the transducer 401 with respect to the tape 406 is accomplished by coarse and fine positioning actuators 414. The lateral repositioning by a coarse actuator is required to access the various tracks of the tape 406 with the transducer 401. A servo system and fine actuator may be employed for accurate lateral repositioning of the transducer 401. An exemplary servo system includes a servo detector 416 to detect both the track that the head is currently on and whether the head is off center. Control unit 402 indicates the track address of a desired new track to position error detection controller 418 for repositioning the head. Servo detector 416 indicates the current track to position error detection controller 418, and the controller provides a servo position error signal to the coarse actuator of positioning actuators 414 which repositions the transducer 401 to the new track. The servo system also provides track following signals to the fine actuator of positioning actuators 414 so that the tracks on tape 406 may be closely spaced.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims

I claim:

1. A magnetic recording head, comprising:
    a support plate having a contoured surface with an opening in said contoured surface;
    at least one head chip comprising a substrate containing a plurality of magnetic recording elements, said head chip positioned to protrude through the opening in the contoured surface of the support plate for read/write access to a magnetic recording tape,
    wherein the at least one head chip includes two transducing surfaces separated in a direction parallel to a direction of tape travel over the at least one head chip by a gap and held in fixed relation to one another,
    wherein the head chip is moveable relative to the support plate in a direction perpendicular to the direction of tape motion over the contoured surface.

2. The magnetic recording head recited in claim 1, wherein the contoured surface of the support plate is contoured in the direction of tape motion over the surface.

3. The magnetic recording head recited in claim 2, wherein the contoured surface of the support plate is a cylindrical contour.

4. The magnetic recording head recited in claim 1, wherein the opening in the contoured surface is approximately centered in said support plate.

5. The magnetic recording head recited in claim 1, wherein the contoured surface of the support plate has a substantially rectangular shape.

* * * * *